United States Patent
Suzuki

(10) Patent No.: US 7,574,717 B2
(45) Date of Patent: Aug. 11, 2009

(54) ACTUATOR FOR PICKUP, PICKUP DEVICE, RECORDING MEDIUM DRIVE DEVICE, AND METHOD OF PRODUCING ACTUATOR FOR PICKUP

(75) Inventor: Jun Suzuki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 243 days.

(21) Appl. No.: 10/594,491

(22) PCT Filed: Mar. 30, 2005

(86) PCT No.: PCT/JP2005/006154

§ 371 (c)(1),
(2), (4) Date: Sep. 28, 2006

(87) PCT Pub. No.: WO2005/096288

PCT Pub. Date: Oct. 13, 2005

(65) Prior Publication Data

US 2007/0195657 A1    Aug. 23, 2007

(30) Foreign Application Priority Data

Mar. 30, 2004  (JP) .............................. 2004-099204
Mar. 30, 2004  (JP) .............................. 2004-099262

(51) Int. Cl.
*G11B 7/08* (2006.01)
(52) U.S. Cl. ...................................... 720/684
(58) Field of Classification Search ................. 720/682, 720/683, 684, 686; 369/44.15, 44.16; 359/813, 359/824; 29/603.1
See application file for complete search history.

(56) References Cited

U.S. PATENT DOCUMENTS

| | | | |
|---|---|---|---|
| 6,285,517 B1 * | 9/2001 | Uekusa et al. | 359/813 |
| 7,054,235 B2 * | 5/2006 | Tsukuda et al. | 369/44.15 |
| 7,162,727 B2 * | 1/2007 | Song et al. | 720/684 |
| 7,168,082 B2 * | 1/2007 | Takeshita et al. | 720/683 |
| 7,292,508 B2 * | 11/2007 | Nogami et al. | 369/44.16 |
| 7,308,752 B2 * | 12/2007 | Tanaka | 29/603.1 |
| 7,319,564 B2 * | 1/2008 | Yamada | 359/824 |
| 7,420,891 B2 * | 9/2008 | Ochi et al. | 369/44.15 |

FOREIGN PATENT DOCUMENTS

| | | |
|---|---|---|
| JP | 3-147530 | 6/1991 |
| JP | 6-236565 | 8/1994 |
| JP | 8-106642 | 4/1996 |

(Continued)

*Primary Examiner*—Tianjie Chen
(74) *Attorney, Agent, or Firm*—Kratz, Quintos & Hanson, LLP

(57) ABSTRACT

An actuator for a pickup has a suspension base (500), a lens holder movable in each of a focusing direction along the optical axis of the objective lens and a tracking direction, for holding an objective lens, and six suspensions (550A-550F) each connected at ends thereof to the suspension base (500) and the lens holder. The suspensions (550A-550F) on a side of the suspension base (500) are positioned on a first virtual circle (X), and connection portions on a side of the lens holder (600) are positioned on a second virtual circle (X). Even when the lens holder turns with respect to the suspension base (500), there is generated no relative displacement in an axial direction as a whole because displacements occurring in all the suspensions (550A-550F) are the same.

10 Claims, 15 Drawing Sheets

FOREIGN PATENT DOCUMENTS

| | | |
|---|---|---|
| JP | 8-273179 | 10/1996 |
| JP | 8-321052 | 12/1996 |
| JP | 2001-93177 | 4/2001 |
| JP | 2001-229555 | 8/2001 |
| JP | 2001-344784 | 12/2001 |
| JP | 2002-184001 | 6/2002 |
| JP | 2003-346366 | 12/2003 |
| JP | 2004-5822 | 1/2004 |
| JP | 2004-47060 | 2/2004 |

* cited by examiner

ACTUATOR FOR PICKUP, PICKUP DEVICE, RECORDING MEDIUM DRIVE DEVICE, AND METHOD OF PRODUCING ACTUATOR FOR PICKUP

TECHNICAL FIELD

The present invention relates to an actuator for a pickup, a pickup device, a recording medium drive device, and a method of producing an actuator for a pickup.

BACKGROUND ART

Conventionally, an actuator for a pickup has been employed as a mechanism for recording data onto an optical recording medium and/or playing back the contents thereof. Such the actuator for a pickup may have various types of constructions. In recent years, among various types of actuators for pickups, studies have been conducted on those capable of recording data onto an optical recording medium and/or playing back the contents thereof at a higher-x speed.

For example, such the actuator for a pickup is equipped with a lens holder for supporting an objective lens, a magnet, and the like, a plurality of drive coils for driving the lens holder, a base, and four linear elastic members each connected at both ends thereof between the lens holder and the base. The lens holder is so supported as to be able to rock in a focusing direction and a tracking direction (e.g., Patent Document 1).

This actuator for a pickup has been drawing attention especially for its advantages in weight saving and enhancement of bandwidth.

In this actuator for a pickup, there is a conventional art in which two of the linear elastic members which are adjacent to each other when viewed from the focusing direction are disposed in a "slanting manner" such that a dimension between connection portions of the linear elastic members connected to the base is larger than a dimension between connection portions of the linear elastic members connected to the lens holder, in view of saving space and improving rolling frequency characteristics. In the actuator for a pickup of this type, two of the linear elastic members which are adjacent to each other when viewed from the tracking direction are disposed in parallel to each other such that a dimension between the connection portions of the linear elastic members connected to the base is equal to a dimension between the connection portions of the linear elastic members connected to the lens holder.

The aforementioned actuator for a pickup may have six or more linear elastic members (Patent Document 2).

In the actuator for a pickup which has six linear elastic members as described above, the six linear elastic members are parallel to one another, and line segments linking the connection portions of the linear elastic members on an actuator base side and line segments linking the connection portions of the linear elastic members on a lens holder side form an oblong, respectively.

[Patent Document 1]: JP 2001-229555 A (FIGS. 15 and 16)
[Patent Document 2]: JP 08-273179 A (paragraph [0031])

DISCLOSURE OF THE INVENTION

Problems to be Solved by the Invention

In the aforementioned conventional actuator for a pickup which has the six linear elastic members, the line segments linking the connection portions of the linear elastic members form an oblong. Therefore, when the lens holder turns (i.e., rolls) with respect to the base, a rise in rolling frequency leads to an increase in spring constant in a torsional direction. As a result, deterioration in damping characteristics is caused.

FIG. 1A is a schematic diagram showing a state in which six linear elastic members are arranged as viewed in a direction from a lens holder to a base. In FIG. 1A, a total of six linear elastic members 102A to 102F, which are composed of two upper linear elastic members, two central elastic members, and two lower elastic members, are connected between a base 100 and the lens holder. These linear elastic members 102A to 102F extend in parallel to one another.

In this case, when the lens holder turns with respect to a center O of the base 100 by an angle θ, tensile forces are generated in all the linear elastic members 102A to 102F, respectively. Of those linear elastic members 102A to 102F, the linear elastic members 102A, 102B, 102D, and 102E, which are located at four corners of the base 100, respectively, are spaced apart from the center O by a distance d1, and the linear elastic members 102C and 102F, which are located at central portions of the base 100, respectively, are spaced apart from the center O by a distance d2 (d2<d1).

The linear elastic members 102A, 102B, 102D, and 102E located at the four corners, respectively, are displaced by a displacement amount h1=d1×tan θ when being turned. The linear elastic members 102C and 102F located at the central portions, respectively, are displaced by a displacement amount h2=d2×tan θ (d2<d1) when being turned. Therefore, there is established a relationship: h2<h1. As a whole, a relative displacement occurs in an axial direction, so a rise in rolling frequency is caused.

Therefore, no damping effect is achieved and oscillation continues.

On the other hand, in the aforementioned conventional actuator for a pickup which has the four linear elastic members, the two linear elastic members are disposed in a "slanting manner" when viewed from the focusing direction, and the two linear elastic members are disposed parallel to each other when viewed from the tracking direction. Therefore, when the lens holder turns (i.e., rolls) with respect to the base, a rise in rolling frequency leads to an increase in spring constant in the torsional direction. As a result, deterioration in damping characteristics is caused.

FIG. 1B is a schematic diagram showing a state in which four linear elastic members are arranged as viewed in a direction from a lens holder to a base. In FIG. 1B, a total of four linear elastic members 102A to 102D, which are composed of two upper linear elastic members and two lower linear elastic members, are connected between the base 100 and a lens holder 101. The two linear elastic members 102A and 102B disposed above and the two linear elastic members 102C and 102D disposed below extend in parallel to each other, respectively. However, the linear elastic members 102A and 102B are disposed in a "slanting manner" such that virtual line segments of the linear elastic members 102A and 102B extending in a longitudinal direction intersect with each other at a single point. Similarly, the linear elastic members 102C and 102D are disposed in a "slanting manner" such that virtual line segments of the linear elastic members 102C and 102D extending in the longitudinal direction intersect with each other at a single point.

In this case, when the lens holder 101 turns with respect to the center O of the base 100 by the angle θ, tensile forces are respectively generated in the linear elastic members 102A and 102C which are opposed to each other across the center O, and compressive forces are respectively generated in the linear elastic members 102B and 102D which are opposed to each other across the center O. Therefore, a relative displacement in the axial direction occurs, which increases the rolling frequency.

In this case as well, no damping effect is achieved and oscillation continues.

In the respective conventional examples as described above, in addition to a problem of a deterioration in damping characteristics, there is also a problem in that considerable mounting accuracy in a production process is required and that deformation is generated due to changes in temperature caused by a difference in coefficients of linear expansion between a material of the linear elastic members (i.e., metal) and a material of the base and the lens holder (i.e., synthetic resin).

It is an object of the present invention to provide an actuator for a pickup which makes it possible to suppress a rise in rolling frequency and to prevent deterioration in damping characteristics even when a movable portion is turned with respect to a fixed portion, a pickup device, a recording medium drive device, and a method of producing an actuator for a pickup.

MEANS FOR SOLVING THE PROBLEMS

According to an aspect of the present invention, an actuator for a pickup includes: a fixed portion; a movable portion movable in each of a focusing direction extending along an optical axis of an objective lens and in a tracking direction substantially perpendicular to the focusing direction, for holding the objective lens; and a plurality of linear elastic members of five or more each having ends connected to the movable portion and the fixed portion, respectively. The linear elastic members that are adjacent to each other when viewed from the focusing direction are designed such that a dimension between connections portions of the linear elastic members connected to the fixed portion is larger than the dimension between connection portions of the linear elastic members connected to the movable portion. The plurality of linear elastic members have connection portions on a side of the fixed portion which are located on a first virtual circle and connection portions on a side of the movable portion which are located on a second virtual circle.

According to another aspect of the present invention, an actuator for a pickup includes: a fixed portion; a movable portion movable in each of a focusing direction extending along an optical axis of an objective lens and in a tracking direction substantially perpendicular to the focusing direction, for holding the objective lens; and a plurality of linear elastic members of four or more each having ends connected to the movable portion and the fixed portion, respectively. The linear elastic members that are adjacent to each other when viewed from the focusing direction are designed such that a dimension between connection portions of the linear elastic members connected to the fixed portion is different from a dimension between connection portions of the linear elastic members connected to the movable portion. The linear elastic members that are adjacent to each other when viewed from the tracking direction are designed such that a dimension between connection portions of the linear elastic members connected to the fixed portion is different from a dimension between connection portions of the linear elastic members connected to the movable portion. The connection portions of the plurality of linear elastic members on a side of the fixed portion are located on a first virtual circle. The connection portions of the plurality of linear elastic members on a side of the movable portion are located on a second virtual circle that is different from the first virtual circle. The two virtual circles have a virtual center line connecting centers thereof to each other, the virtual center line intersecting at a single point with virtual extended lines extending on the side of the movable portion in a longitudinal direction of the plurality of linear elastic members.

A pickup device according to still another aspect of the present invention includes the actuator for a pickup of the present invention and an actuator drive portion for driving the actuator for a pickup.

A recording medium drive device according to yet another aspect of the present invention includes the pickup device according to the present invention.

According to further aspect of the present invention, a method of producing an actuator for a pickup including a fixed portion, a movable portion movable in each of a focusing direction extending along an optical axis of an objective lens and in a tracking direction substantially perpendicular to the focusing direction, for holding the objective lens, and a plurality of linear elastic members of five or more each having ends connected to the movable portion and the fixed portion, respectively includes the steps of: disposing the linear elastic members that are adjacent to each other when viewed from the focusing direction such that a dimension between connection portions of the linear elastic members connected to the fixed portion is larger than a dimension between connection portions of the linear elastic members connected to the movable portion, in connecting the plurality of linear elastic members to the fixed portion and the movable portion; locating connection portions of the plurality of linear elastic members on a side of the fixed portion on a first virtual circle; and locating connection portions of the plurality of linear elastic members on a side of the movable portion on a second virtual circle.

Further, according to still further aspect of the present invention, a method of producing an actuator for a pickup including a fixed portion, a movable portion movable in each of a focusing direction extending along an optical axis of an objective lens and in a tracking direction substantially perpendicular to the focusing direction, for holding the objective lens, and a plurality of linear elastic members of four or more each having ends connected to the movable portion and the fixed portion, respectively includes the steps of: disposing the linear elastic members that are adjacent to each other when viewed from the focusing direction such that a dimension between connection portions of the linear elastic members connected to the fixed portion is different from a dimension between connection portions of the linear elastic members connected to the movable portion, in connecting the plurality of linear elastic members to the fixed portion and the movable portion; disposing the linear elastic members are adjacent to each other when viewed from the tracking direction such that a dimension between connection portions of the linear elastic members connected to the fixed portion is different from a dimension between connection portions of the linear elastic members connected to the movable portion, in connecting the plurality of linear elastic members to the fixed portion and the movable portion; locating the connection portions of the plurality of linear elastic members on a side of the fixed portion on a first virtual circle; locating the connection portions of the plurality of linear elastic members on a side of the movable portion on a second virtual circle that is different from the first virtual circle; and disposing the plurality of linear elastic members such that a virtual center line connecting centers of the two virtual circles to each other intersects at a single point with virtual extended lines extending on the side of the movable portion in a longitudinal direction of the plurality of linear elastic members.

EXPLANATION OF CODES 1 pickup device
400 actuator for pickup
500 suspension base (fixed portion)
500A-500F connection portion
500X first virtual circle
550A-550F suspension (linear elastic member)
600 lens holder (movable portion)
600A-600F connection portion
600X second virtual circle
X virtual circle
A-D virtual extended line

BEST MODES FOR CARRYING OUT THE INVENTION

Embodiment 1

Embodiment 1 of the present invention will be described hereinafter with reference to the drawings.

[Construction of Pickup Device]

Figure 1A:
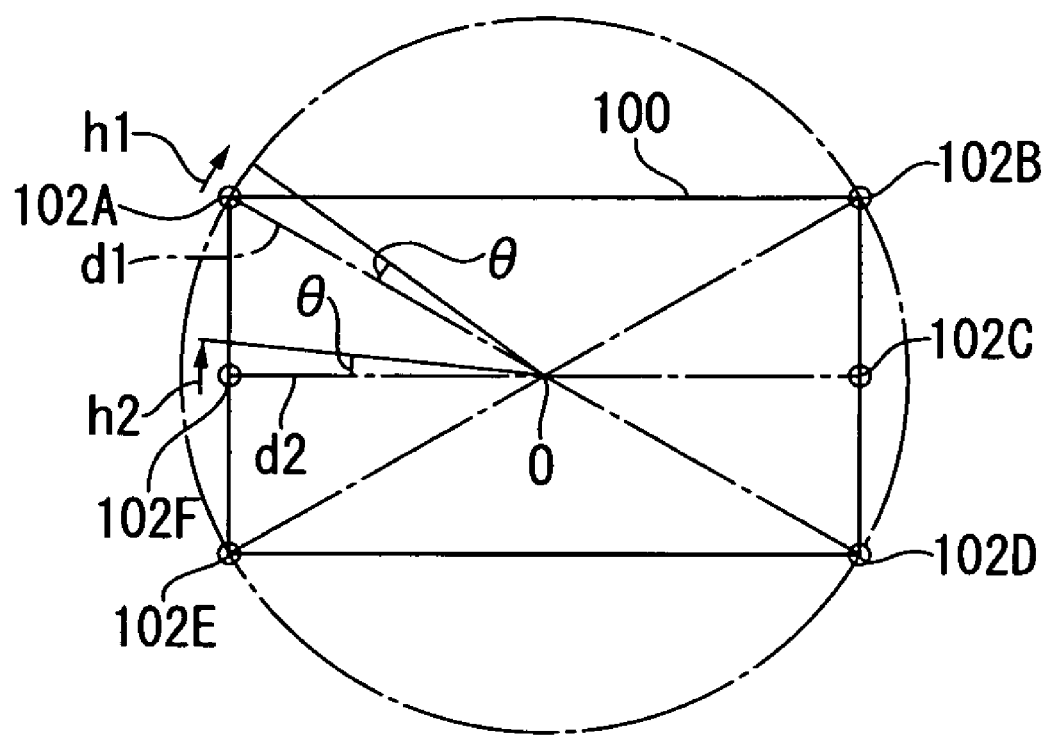
[FIG. 1A] A schematic diagram showing a state in which six linear elastic members are arranged in a conventional art as viewed in a direction from a lens holder to a base.
Figure 1B:
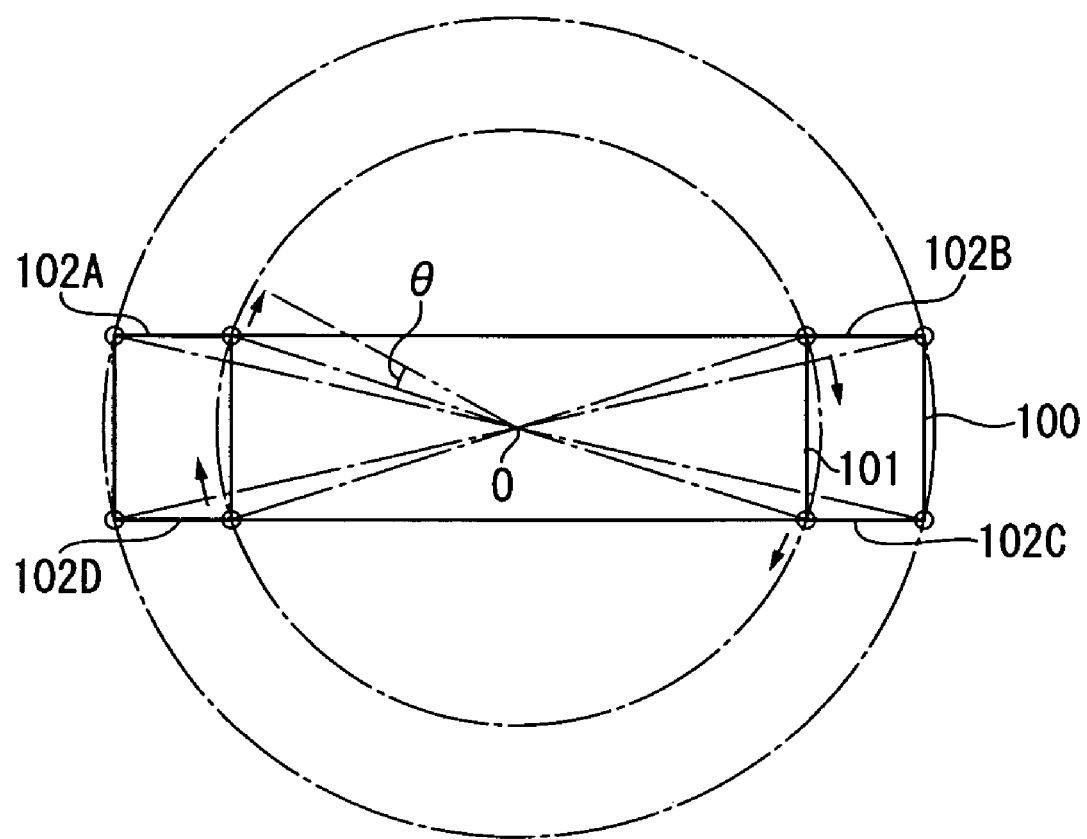
[FIG. 1B] A schematic diagram showing a state in which four linear elastic members are arranged in another conventional art as viewed in a direction from a lens holder to a base.
Figure 2:
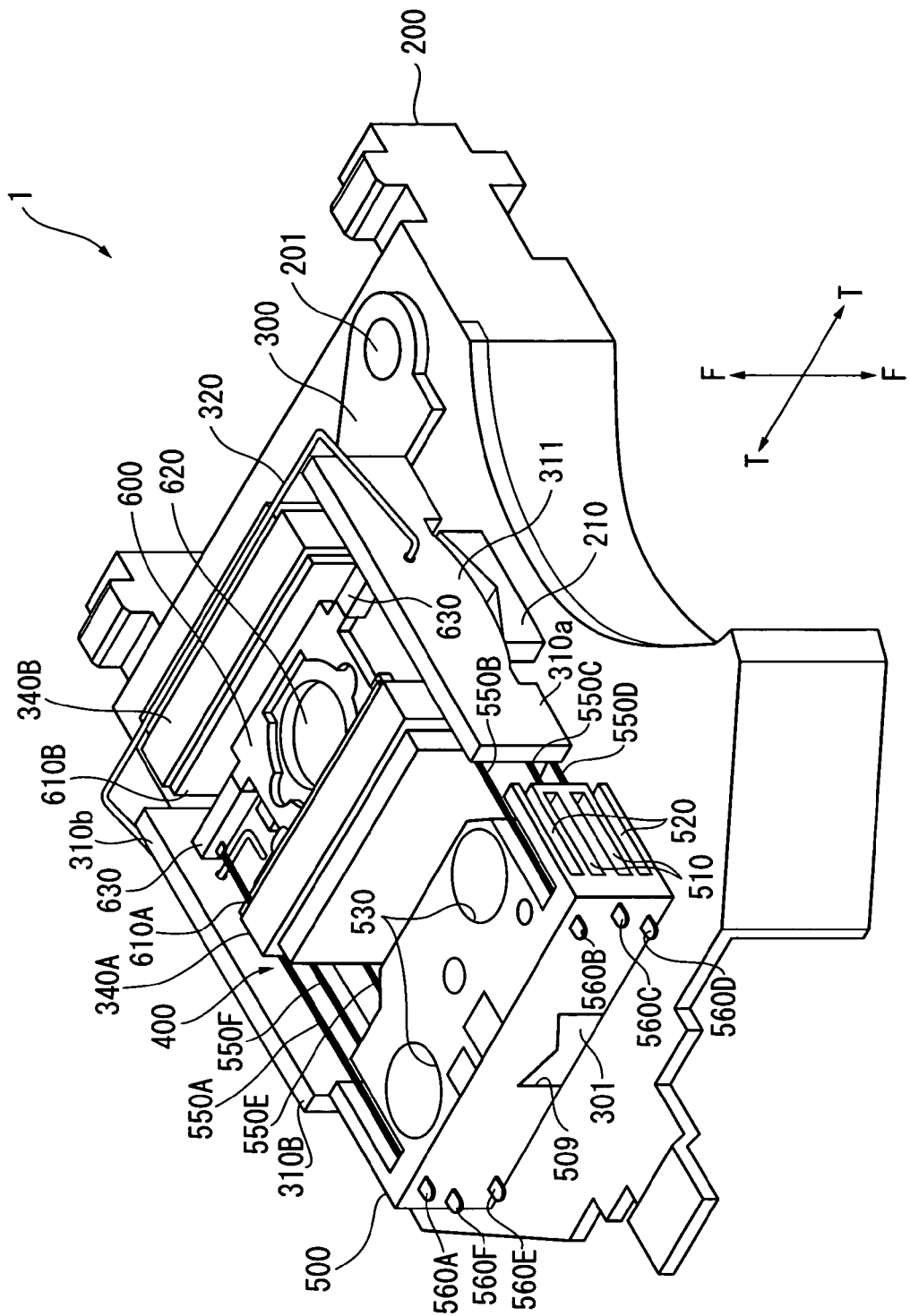
[FIG. 2] A perspective view showing an entire pickup device according to Embodiment 1 of the present invention.
Figure 3:
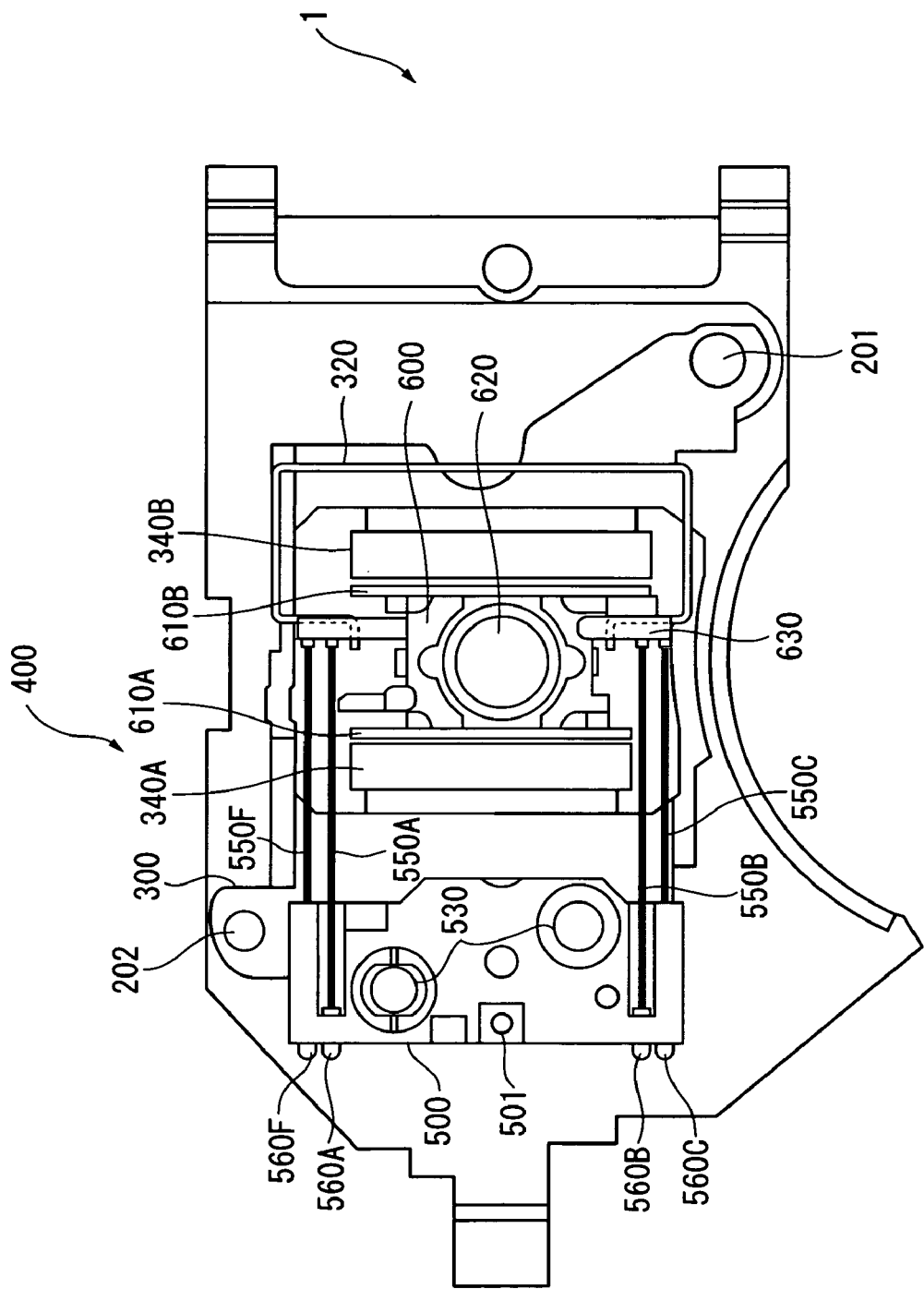
[FIG. 3] A plan view showing the entire pickup device according to the Embodiment 1 of the present invention.

In FIGS. 2 and 3, a pickup device 1 is a device for recording data onto an optical disc as an optical recording medium such as a CD, a DVD, or a blue ray, and/or playing back contents thereof. Accordingly, the pickup device 1 is incorporated into, for example, a drive device for recording data onto those optical recording media and/or playing back the contents thereof.

This pickup device 1 is equipped with a pickup body 200, an actuator base 300 fixed to the pickup body 200, and an actuator 400 for a pickup fixed to the actuator base 300.

The actuator 400 for the pickup is equipped with a suspension base 500 as a fixed portion, a lens holder 600 as a movable portion, and six suspensions 550A to 550F as linear elastic members for connecting the suspension base 500 and the lens holder 600 to each other.

The actuator base 300 is equipped with erected portions 310a and 310b extending in parallel to each other. Projections 311 protruding toward the pickup body 200 side are formed on the erected portions 310a and 310b, respectively.

The actuator base 300 is positioned by engaging the projections 311 with an M-shaped holding portion 210 formed on the pickup body 200. The actuator base 300 is inserted at one end thereof in a spring-loaded strut 201 fixed to the pickup body 200, and fixed at the other end by means of a fixing screw 202.

The actuator 400 for the pickup is positioned between the erected portions 310a and 310b by engaging a V-shaped groove 509 formed in the suspension base 500 with an M-shaped protruding plate 301 formed on the actuator base 300. The actuator 400 for the pickup is fixed to the actuator base 300 by fastening the suspension base 500 to the actuator base 300 by means of screws.

The erected portions 310a and 310b are provided with a stopper member 320. The stopper member 320 is a linear member that is bent generally into a squared U shape as a whole. Tips of the stopper member 320 are provided with restricting portions (not shown) protruding inwardly of the erected portions 310a and 310b, namely, toward the lens holder 600 side. The stopper member 320 is mounted by inserting the restricting portions into insertion holes (not shown) provided in the erected portions 310a and 310b. The stopper member 320 serves to limit strokes (i.e., movable range) of the lens holder 600 in a focusing direction F and a tracking direction T. Thus, when a focus servo or a tracking servo malfunctions, the lens holder 600 itself, a member mounted on the lens holder 600 and the like are prevented from being damaged through a movement of the lens holder 600 leading to a collision thereof with the pickup body 200 or other members.

A laser beam source (not shown) is mounted at an end of the actuator base 300. Laser beams emitted from the laser beam source pass through an optical path constituted by an optical system disposed within the actuator base 300, and then reach a region below an objective lens 620 to be described later. A raising mirror (not shown) is disposed below the objective lens 620. The laser beams are deflected upward by the raising mirror and pass through the objective lens 620 upward from below. An optical disc (not shown) is disposed above the objective lens 620. The objective lens 620 converges the laser beams onto an information recording face of the optical disc.

The suspensions 550A to 550F connect the suspension base 500 to the lens holder 600. For the suspensions 550A to 550F, it is preferable to use a material which is so strong that is resistant to a large bending stress as a spring material and which exhibits excellent fatigue properties for repeated operations, for example, beryllium copper. Instead of using beryllium copper, however, as an alternative material, it is also appropriate to use other materials exhibiting high strength and excellent fatigue properties, such as a phosphor-bronze alloy.

Tips of the suspensions 550A to 550F are provided with flat plate portions 560A to 560F, which are inserted-molded with the suspension base 500 and the lens holder 600.

The suspension base 500 is formed through insert molding, namely, by installing the flat plate portions 560A to 560F at the tips of the suspensions 550A to 550F in a mold and injecting a synthetic resin.

Concave suspension insertion portions 520 are formed at four corners of the suspension base 500, respectively. The suspensions 550A to 550F are inserted into the suspension insertion portions 520, respectively, and the flat plate portions 560A to 560F provided at the tips of the suspensions 550A to 550F, respectively, are so mounted as to extend through from a face opposed to the suspension insertion portions to a rear face side.

A V-shaped groove 509 is formed on a rear face of the suspension base 500. The V-shaped groove 509 is engaged with the M-shaped protruding plate 301 formed on the actuator base 300, thereby positioning the suspension base 500 on the actuator base 300.

Two mounting holes 530 are so provided as to extend through from an upper face of the suspension base 500 to a lower face thereof. The actuator 400 for the pickup is fixed to the actuator base 300 by inserting spring-loaded screws (not shown) and fixing screws (not shown) into the mounting holes 530, respectively.

The lens holder 600 is connected to the suspension base 500 in a rockable manner by means of the six suspensions 550A to 550F. The lens holder 600 is a generally rectangular member with a hollow structure which has been molded with a synthetic resin. The lens holder 600 is formed simultaneously with the suspension base 500 through insert molding, namely, by installing the flat plate portions 560 of the suspensions 550A to 550F in the mold and injecting a synthetic resin. A pair of support arms 630 are respectively provided at opposite ends of the lens holder 600 in the tracking direction T. The suspensions 550A to 550F are fixed at ends thereof to the corresponding support arms 630.

Coil substrates 610A and 610B are respectively mounted on opposite lateral faces of the lens holder 600, and the objective lens 620 is mounted at substantially a center of an upper face of the lens holder 600.

Magnets 340A and 340B are so fixed to the actuator base 300 as to be opposed to the pair of the coil substrates 610A and 610B, respectively, mounted on the lens holder 600. The coil substrates 610A and 610B and the magnets 340A and 340B constitute the actuator drive portion according to this embodiment.

The pair of the magnets 340A and 340B are fixed at opposing positions, and a magnetic field is formed in a space between the magnets 340A and 340B according to magnetization patterns of the respective magnets 340A and 340B.

The lens holder 600 having the coil substrates 610A and 610B mounted to the lateral faces thereof is disposed within the magnetic field formed by the pair of magnets 340A and 340B. Thus, when a driving current having a frequency within a predetermined servo bandwidth (e.g., 0 to 5 KHz) is caused to flow through a focusing coil and a tracking coil, which are respectively formed on the coil substrates 610A and 610B, the lens holder 600 moves together with the objective lens 620 in the focusing direction F and the tracking direction T due to a force generated by currents within the coils and the magnetic field.

[Mounting Structure of Suspensions]

Figure 4A:
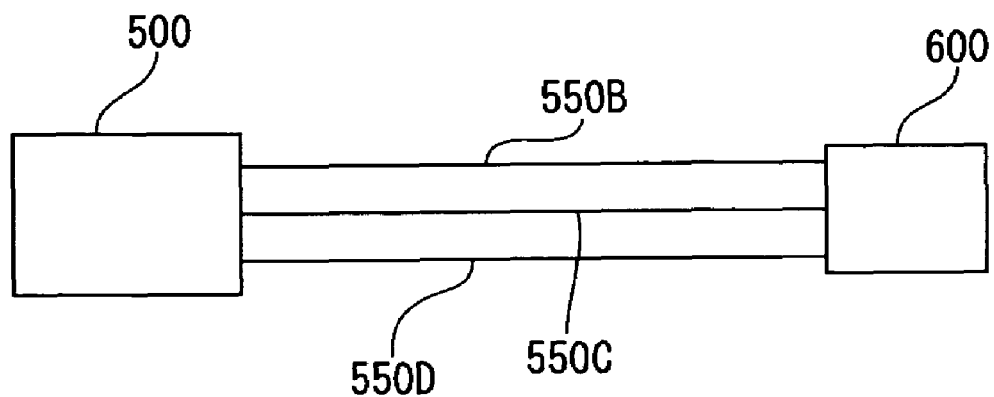
[FIG. 4A] A schematic diagram showing a mounting structure of suspensions according to the Embodiment 1 of the present invention as viewed from a tracking direction.
Figure 4B:
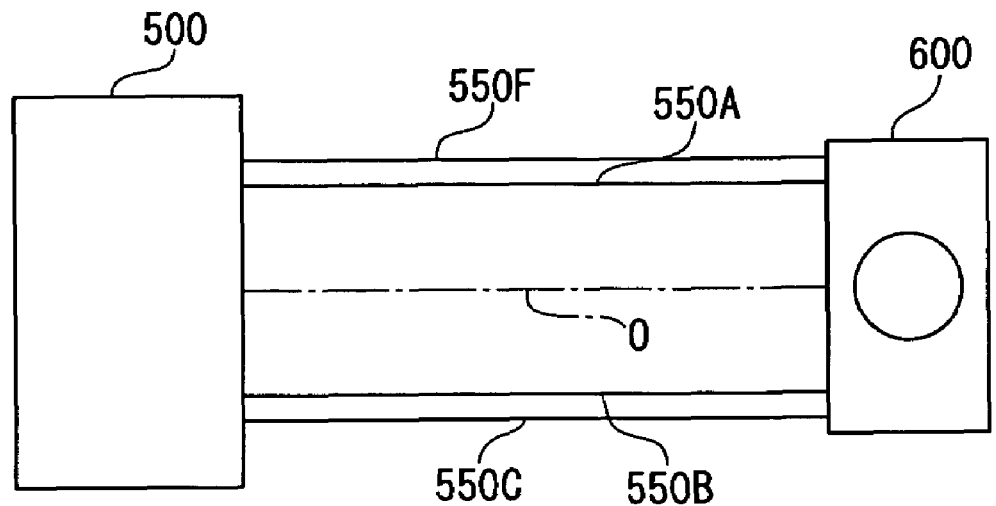
[FIG. 4B] A schematic diagram showing the mounting structure of the suspensions according to the Embodiment 1 of the present invention as viewed from a focusing direction.
Figure 5:
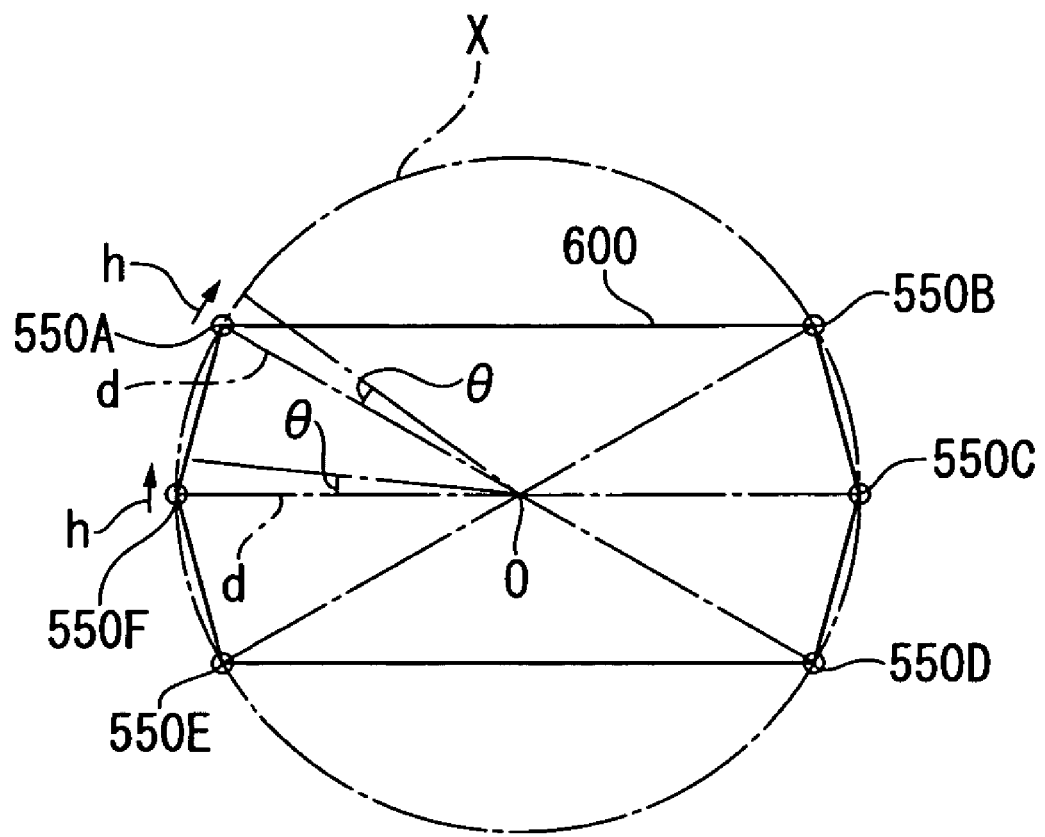
[FIG. 5] A schematic diagram showing the mounting structure of the suspensions according to the Embodiment 1 of the present invention as viewed in a direction from a suspension base to a lens holder.

FIGS. 4A, 4B, and 5 each schematically show a mounting structure of the suspensions 550A to 550F.

In FIGS. 4A and 4B, the six suspensions 550A to 550F are disposed in parallel to one another as viewed from both the tracking direction and the focusing direction.

In FIG. 5, connection portions of the six suspensions 550A to 550F on each of the suspension base 500 side and the lens holder 600 side are located on a virtual circle X, and a center O of the virtual circle X serves as a rotating center of the lens holder 600. These suspensions 550A to 550F are each spaced apart from the rotating center O by a dimension d. In this embodiment, the suspensions 550A to 550F extend in parallel to one another, so a first virtual circle on which the respective connection portions of the suspensions 550A to 550F on the suspension base 500 side are located and a second virtual circle on which the respective connection portions of the suspensions 550A to 550F on the lens holder 600 side are located coincide with each other to constitute the virtual circle X.

Of the suspensions 550A to 550F, the suspension 550A and the suspension 550D are disposed symmetrically with respect to the center O, the suspension 550B and the suspension 550E are disposed symmetrically with respect to the center O, and the suspension 550C and the suspension 550F are disposed symmetrically with respect to the center O.

A distance between the adjacent suspensions 550B and 550C, a distance between the adjacent suspensions 550C and 550D, a distance between the adjacent suspensions 550E and 550F, and a distance between the adjacent suspensions 550F and 550A are equal to one another. A line segment connecting the suspension 550C to the suspension 550F is perpendicular to the focusing direction.

In the actuator 400 for the pickup constructed as described above, when the lens holder 600 turns with respect to the suspension base 500 by the angle θ, tensile forces are generated in all the suspensions 550A to 550F. However, since all the suspensions 550A to 550F are each spaced apart from the rotating center O by the dimension d, all the amounts of displacement h caused during turning are equal to d×tan θ. As a result, no relative displacement is generated in the axial direction as a whole.

[Method of Producing Actuator for Pickup]

To produce the actuator 400 for the pickup according to this embodiment, the six suspensions 550A to 550F are first disposed at predetermined positions of a mold (not shown) having a cavity for forming the suspension base 500 and the lens holder 600. The six suspensions 550A to 550F are so disposed as to extend in parallel to one another and to be located on a virtual circle.

After that, a synthetic resin in a fluid state is injected into the mold. Then, the actuator 400 for the pickup is insert-molded with the suspensions 550A to 550F connected between the suspension base 500 and the lens holder 600.

[Operational Effects of Actuator for Pickup]

Embodiment 1 of the present invention described above has the following effects.

(1) The actuator 400 for the pickup according to Embodiment 1 of the present invention is equipped with the suspension base 500, the lens holder 600 designed to be movable in each of the tracking direction and the focusing direction extending along an optical axis of the objective lens 620, for holding the objective lens 620, and the six suspensions 550A to 550F each having ends connected to the suspension base 500 and the lens holder 600, respectively. These suspensions 550A to 550F on the suspension base 500 side are located on the virtual circle X, and the connection portions on the lens holder 600 side are located on the virtual circle X. Thus, even when the lens holder 600 turns with respect to the suspension base 500, the amounts of displacement of all the six suspensions 550A to 550F are equal to one another. Therefore, no relative displacement occurs in the axial direction as a whole. Accordingly, a rise in rolling frequency can be suppressed to prevent deterioration in damping characteristics.

(2) The number of the suspensions 550A to 550F is six. Therefore, uniform disposition of these suspensions 550A to 550F around the rotating center O makes it possible to ensure stable movements of the lens holder 600.

(3) The pickup device 1 according to Embodiment 1 of the present invention is equipped with the actuator 400 for the pickup having the aforementioned construction, and the coil substrates 610A and 610B and the magnets 340A and 340B for driving the actuator 400 for the pickup. Therefore, the pickup device 1 capable of achieving the aforementioned effects can be provided.

(4) The recording medium drive device according to Embodiment 1 of the present invention is equipped with the pickup device 1 having the aforementioned construction. Therefore, the recording medium drive device capable of achieving the aforementioned effect can be provided.

(5) In producing the actuator 400 for the pickup, the six suspensions 550A to 550F are installed in the mold at the predetermined positions, and a molten resin is injected from the injection port of the mold to perform insert molding. Therefore, simultaneously with the molding of the suspension base 500 and the lens holder 600, these members can be connected by means of the suspensions 550A to 550F. As a result, the actuator 400 for the pickup can be produced in a short period of time.

(6) The six suspensions 550A to 550F extend in parallel to one another, so the suspensions 550A to 550F can be positioned on the suspension base 500 and the lens holder 600 with ease. As a result, the actuator 400 for the pickup can be produced with ease.

Embodiment 2

Embodiment 2 of the present invention will be described with reference to FIGS. 6 and 7.

Embodiment 2 of the present invention is different from Embodiment 1 of the present invention in disposition of the suspensions 550A to 550F. Embodiment 2 of the present invention is identical to Embodiment 1 of the present invention in other constructional details. In describing Embodiment 2 of the present invention, the same components as in Embodiment 1 are denoted by the same reference symbols and therefore description thereof will be omitted.

[Mounting Structure of Suspensions]

Figure 6A:
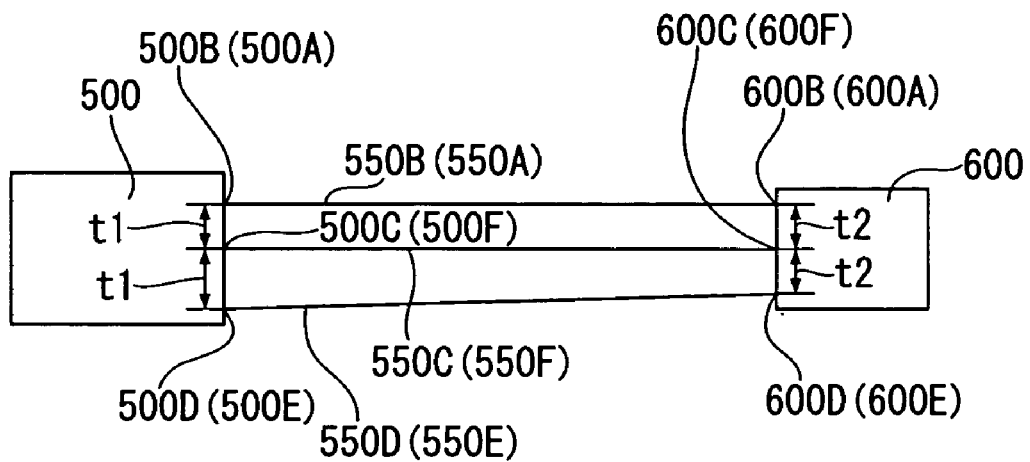
[FIG. 6A] A schematic diagram showing a mounting structure of suspensions according to Embodiment 2 of the present invention as viewed from a tracking direction.
Figure 6B:
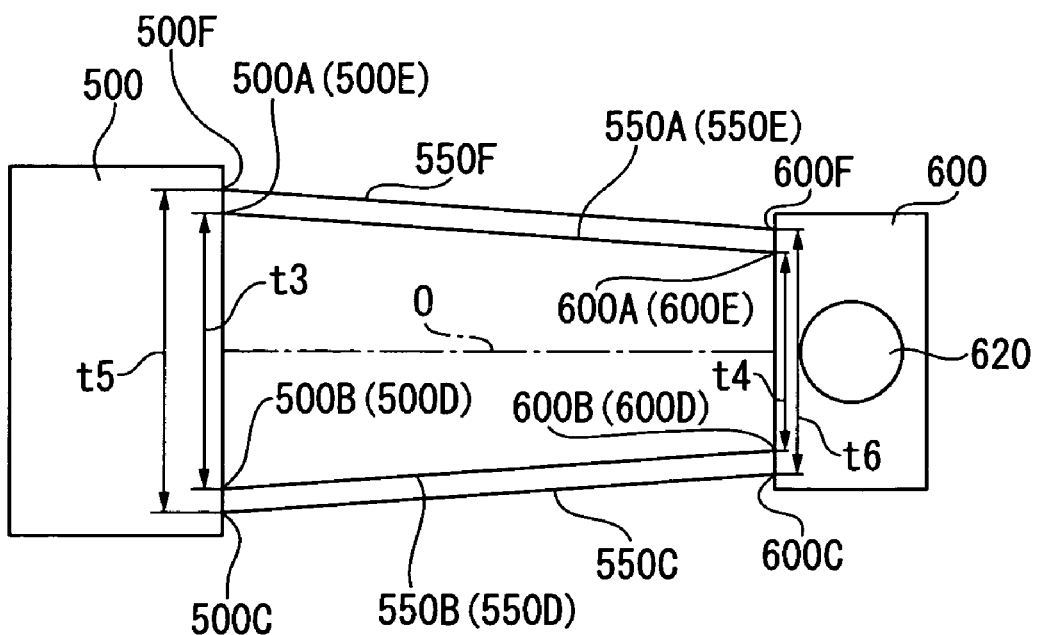
[FIG. 6B] A schematic diagram showing the mounting structure of the suspensions according to the Embodiment 2 of the present invention as viewed from a focusing direction.
Figure 7:
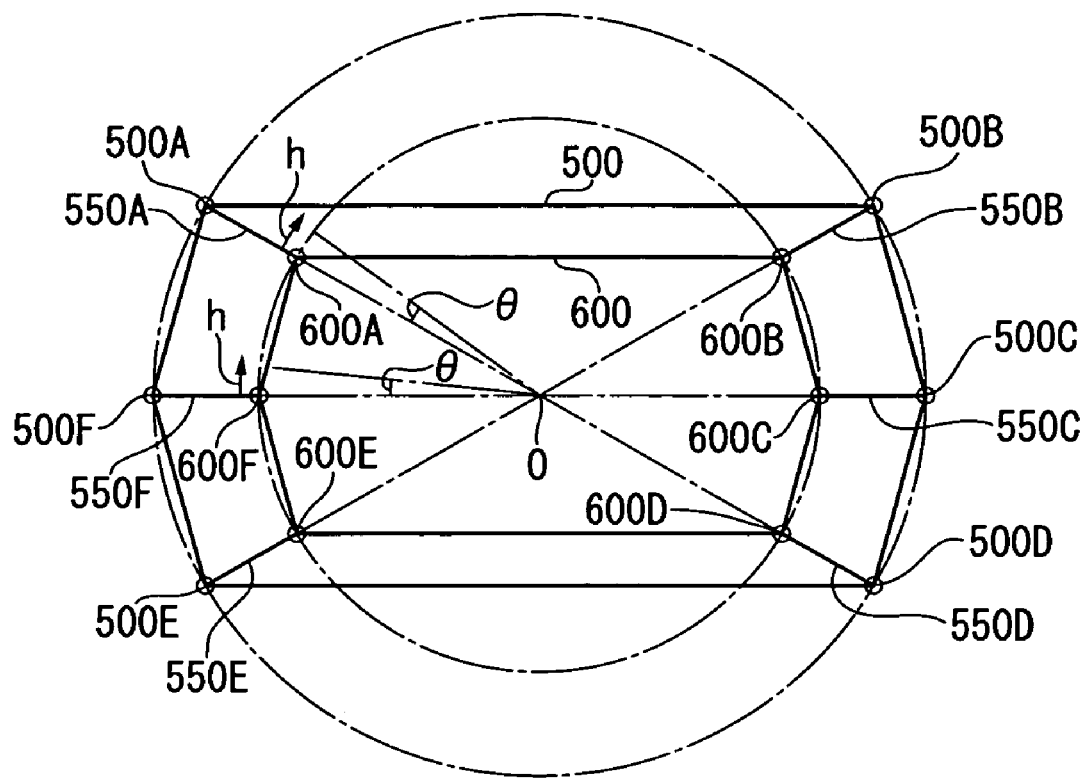
[FIG. 7] A schematic diagram showing the mounting structure of the suspensions according to the Embodiment 2 of the present invention as viewed in a direction from a suspension base to a lens holder.

FIGS. 6A, 6B, and 7 each schematically show a mounting structure of the suspensions 550A to 550F.

In FIG. 6A, the suspension 550C is so disposed as to extend perpendicularly to the focusing direction when viewed from the tracking direction. The suspensions 550B and 550D are so disposed as to sandwich the suspension 550C.

The adjacent suspensions 550B and 550C are designed such that a dimension t1 between connection portions 500B and 500C of the suspensions connected to the suspension base 500 is larger than a dimension t2 between connection portions 600B and 600C of the suspensions connected to the lens holder 600. The adjacent suspensions 550C and 550D are designed such that the dimension t1 between the connection portions 500C and 500D of the suspensions connected to the suspension base 500 is larger than the dimension t2 between the connection portions 600C and 600D of the suspensions connected to the lens holder 600. The suspensions 550B and 550C are disposed substantially in a slanting manner. That is, the suspensions 550B and 550D are disposed substantially in a slanting manner.

Similarly, the adjacent suspensions 550A and 550F are designed such that the dimension t1 between the connection portions 500A and 500F of the suspensions connected to the suspension base 500 is larger than the dimension t2 between the connection portions 600A and 600F of the suspensions connected to the lens holder 600. The adjacent suspensions 550F and 550E are designed such that the dimension t1 between the connection portions 500F and 500E of the suspensions connected to the suspension base 500 is larger than the dimension t2 between the connection portions 600F and 600E of the suspensions connected to the lens holder 600. The suspensions 550E and 550A are disposed substantially in a slanting manner.

In FIG. 6B, the suspensions 550A and 550B, which are adjacent to each other when viewed from the focusing direction, are designed such that a dimension t3 between the connection portions 500A and 500B of the suspensions connected to the suspension base 500 is larger than a dimension t4 between the connection portions 600A and 600B of the suspensions connected to the lens holder 600. The suspensions 550A and 550B are disposed substantially in a slanting manner.

Similarly, the adjacent suspensions 550D and 550E, which are adjacent to each other when viewed from the focusing direction, are designed such that the dimension t3 between the connection portions 500D and 500E of the suspensions connected to the suspension base 500 is larger than the dimension t4 between the connection portions 600D and 600E of the suspensions connected to the lens holder 600. The suspensions 550D and 550E are disposed substantially in a slanting manner.

The suspensions 550C and 550F, which are adjacent to each other when viewed from the focusing direction, are designed such that a dimension t5 between the connection portions 500C and 500F of the suspensions connected to the suspension base 500 is larger than a dimension t6 between the connection portions 600C and 600F of the suspensions connected to the lens holder 600. The suspensions 550C and 550F are disposed substantially in a slanting manner.

In FIG. 7, the connection portions 500A to 500F of the suspensions 550A to 550F on the suspension base 500 side are located on a first virtual circle 500X, and the connection portions 600A to 600F of the suspensions 550A to 550F on the lens holder 600 side are located on a second virtual circle 600X. The first virtual circle 500X and the second virtual circle 600X are not identical to each other.

Centers of those two virtual circles 500X and 600X coincide with each other and serve as the rotating center O of the lens holder 600.

In the actuator 400 for the pickup constructed as described above, when the lens holder 600 turns with respect to the suspension base 500 by the angle θ, tensile forces are generated in all the suspensions 550A to 550F. However, since all these suspensions 550A to 550F are each spaced apart from the rotating center O by the dimension d, all the amounts of displacement h caused during turning are equal to d×tan θ. As a result, no relative displacement occurs in the axial direction as a whole.

Accordingly, in addition to operational effects similar to the above-mentioned items (1) to (5) of Embodiment 1 of the present invention, the following operational effects can be achieved in Embodiment 2 of the present invention.

(7) The suspensions 550A to 550F, corresponding ones of which are adjacent to each other when viewed from both the focusing direction and the tracking direction, are designed such that the dimension between corresponding ones of the connection portions 500A to 500F of the suspensions connected to the suspension base 500 is larger than the dimension between corresponding ones of the connection portions 600A to 600F of the suspensions connected to the lens holder 600. The suspensions 550A to 550F are disposed in a slanting manner. Therefore, the lens holder 600 can be reduced in size, to thereby save space required for the device.

MODIFIED EXAMPLES OF EMBODIMENTS 1 AND 2

As a matter of course, the recording medium drive device according to the present invention is not limited to the Embodiments 1 and 2 of the present invention, and can be modified in various manners without departing from the gist of the present invention.

For example, the six suspensions 550A to 550F are employed in the Embodiments 1 and 2 of the present invention. In the present invention, however, the number of the suspensions 550A to 550F is not specifically limited as long as it is five or more, for example, five, seven, eight, or more.

Further, in the Embodiments 1 and 2 of the present invention, corresponding ones of the connection portions of the suspensions 550A to 550F are made symmetrical to each other vertically (i.e., toward a recording medium and away therefrom) and laterally across the center O of the virtual circle. In the present invention, however, corresponding ones of those connection portions may be asymmetrical to each other. For example, the four suspensions 550A to 550C and 550F may be located above the center O, whereas the two suspensions 550D and 550E may be located below the center O. Corresponding ones of those connection portions may also be made laterally asymmetrical to each other. Further, these suspensions may be so combined with one another as to be disposed in a so-called slanting manner in this asymmetrical arrangement.

In addition, in the Embodiments 1 and 2 of the present invention, an insert molding method is adopted for producing the actuator 400 for the pickup. In the present invention, however, the suspension base 500 and the lens holder 600 may be molded separately or simultaneously by an injection molding method, and the suspensions 550A to 550F may then be glued, soldered, or screwed to the suspension base 500 and the lens holder 600.

In the Embodiment 2 of the present invention, the suspensions 550A to 550F, corresponding ones of which are adjacent to each other when viewed from both the focusing direction and the tracking direction, are designed such that the dimension between corresponding ones of the connection portions 500A to 500F of the suspensions connected to the suspension base 500 is larger than the dimension between corresponding ones of the connection portions 600A to 600F of the suspensions connected to the lens holder 600. In the present invention, however, the opposite construction is also acceptable. In other words, the suspensions 550A to 550F may be formed such that the dimension between corresponding ones of the connection portions 500A to 500F of the suspensions connected to the suspension base 500 is smaller than the dimension between corresponding ones of the connection portions 600A to 600F of the suspensions connected to the lens holder 600.

Further, in the Embodiments 1 and 2 of the present invention, the connection portions of the suspensions 550A to 550F are located on a plane including the focusing direction and the tracking direction. In the present invention, however, the connection portions of the suspensions 550A to 550F may also be offset from one another and not located on the plane.

Figure 8:
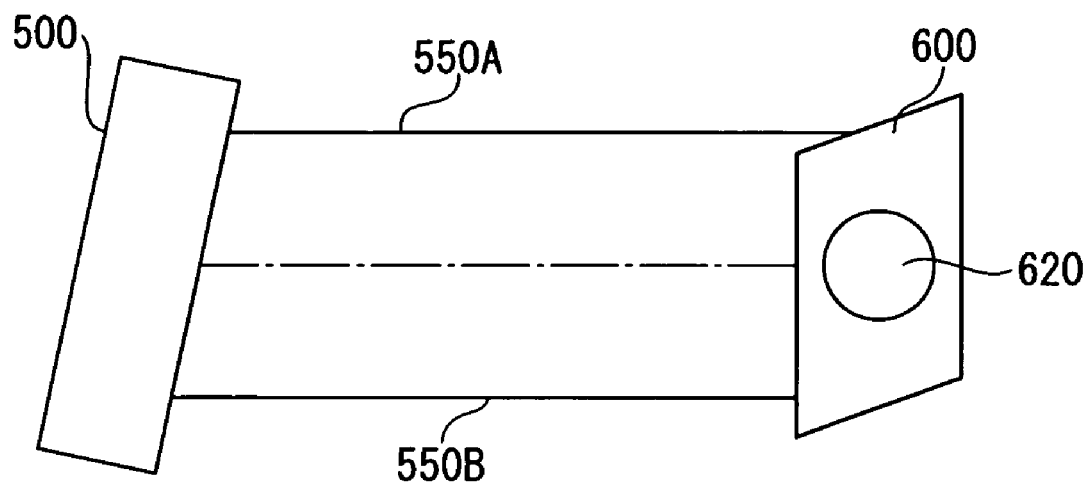
[FIG. 8] A schematic diagram showing a modified example of Embodiments 1 and 2 of the present invention, which corresponds to FIG. 4B.

For example, as shown in FIG. 8, line segments linking the connection portions of the respective suspensions 550A to 550F connected to the lens holder 600 are not parallel to a plane of a coil substrate (not shown) mounted to the lens holder 600. Similarly, line segments linking the connection portions of the respective suspensions 550A to 550F connected to the suspension base 500 are not parallel to the plane of the coil substrate. In FIG. 8, only the suspensions 550A and 550B are illustrated, and other suspensions 550C to 550F are not illustrated.

Embodiment 3

Embodiment 3 of the present invention will be described hereinafter with reference to the drawings.

This embodiment is identical in basic structure to the Embodiment 1 of the present invention. In the following description, therefore, components identical to those of Embodiment 1 of the present invention are denoted by the same reference symbols to omit repetition of the same description. Details different from those of Embodiment 1 of the present invention will be described.

[Construction of Pickup Device]

Figure 9:
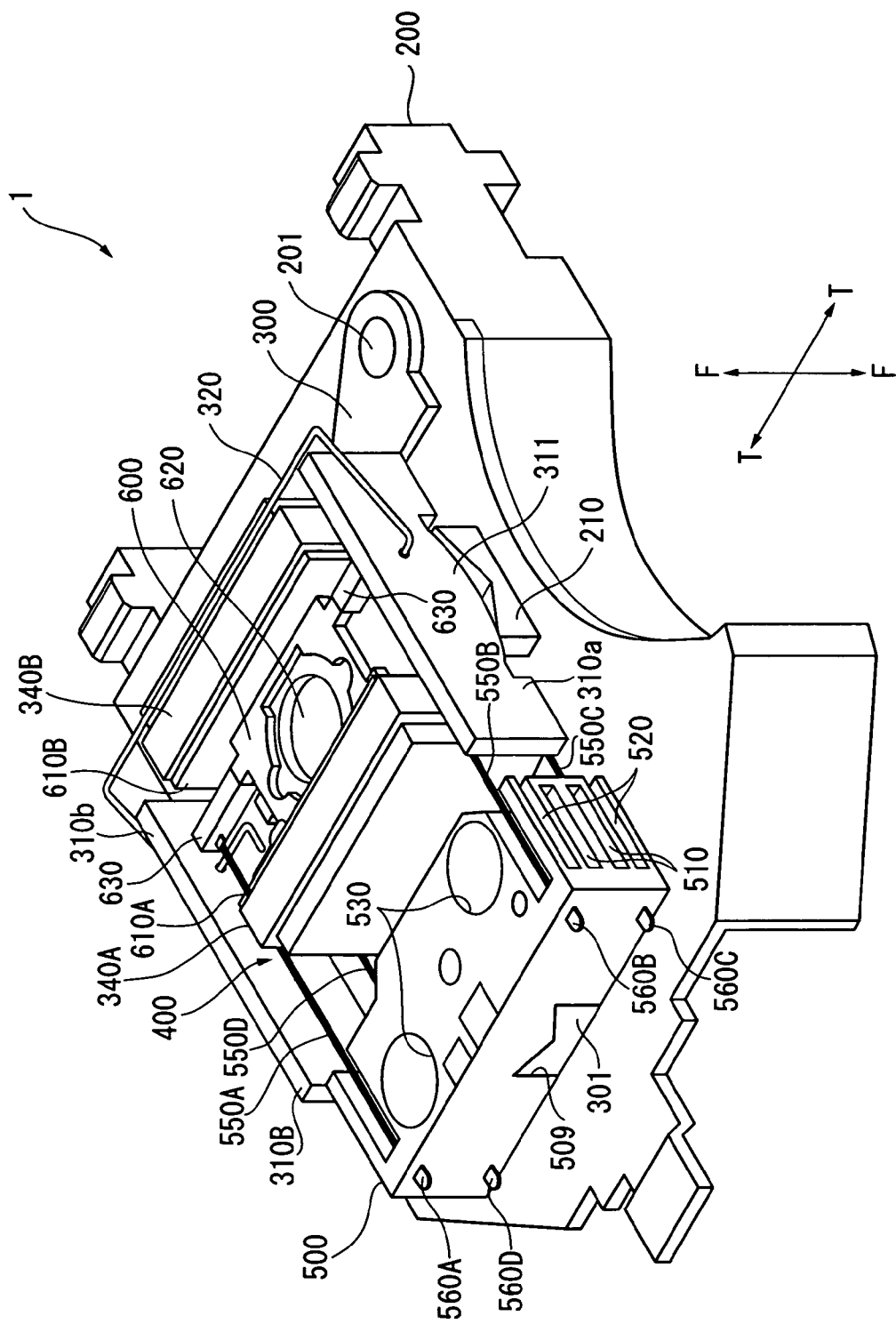
[FIG. 9] A perspective view showing an entire pickup device according to an embodiment of the present invention.
Figure 10:
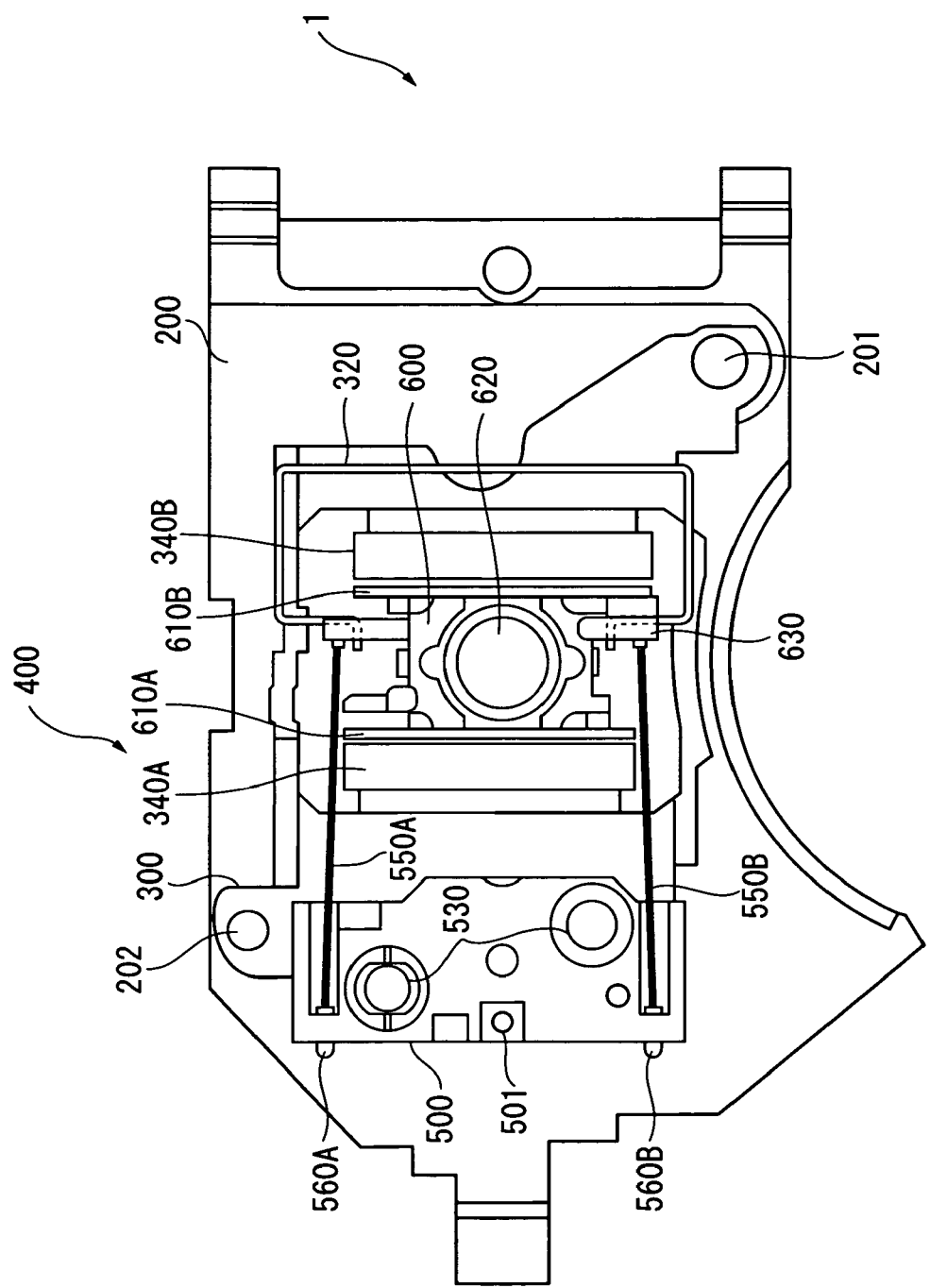
[FIG. 10] A plan view showing the entire pickup device.

FIGS. 9 and 10 show the pickup device 1 according to this embodiment.

The pickup device 1 according to this embodiment basically has the same construction as in the Embodiment 1 of the present invention. However, while the six suspensions 550A to 550F are used as the linear elastic members in Embodiment 1 of the present invention, the four suspensions 550A to 550D are used as the linear elastic members in this embodiment.

That is, the actuator 400 for the pickup is equipped with the suspension base 500 serving as a fixed portion, the lens holder 600 serving as a movable portion, and the four suspensions 550A to 550D serving as the linear elastic members for connecting the suspension base 500 and the lens holder 600 to each other.

The suspensions 550A to 550D connect the suspension base 500 to the lens holder 600. For the suspensions 550A to 550D, it is preferable to use a material which is so strong that is resistant to a large bending stress as a spring material and which exhibits excellent fatigue properties for repeated operations, for example, beryllium copper. Instead of using beryllium copper, however, as an alternative material, it is also appropriate to use other materials exhibiting high strength and excellent fatigue properties, such as a phosphor-bronze alloy.

Tips of the suspensions 550A to 550D are provided with flat plate portions 560A to 560D, which are inserted in the suspension base 500 and the lens holder 600.

The suspension base 500 is formed through insert molding, namely, by installing the flat plate portions 560A to 560D at the tips of the suspensions 550A to 550D in a mold and injecting a synthetic resin.

Concave suspension insertion portions 520 are formed at four corners of the suspension base 500, respectively. The suspensions 550A to 550D are inserted into the suspension insertion portions 520, respectively, and the flat plate portions 560A to 560D provided at the tips of the suspensions 550A to 550D, respectively, are so mounted as to extend through from a face opposed to the suspension insertion portions to a rear face side.

A V-shaped groove 509 is formed on a rear face of the suspension base 500. The V-shaped groove 509 is engaged with the M-shaped protruding plate 301 formed on the actuator base 300, thereby positioning the suspension base 500 on the actuator base 300.

The two mounting holes 530 are so provided as to extend through from the upper face of the suspension base 500 to the lower face thereof. The actuator 400 for the pickup is fixed to the actuator base 300 by respectively inserting spring-loaded screws (not shown) and fixing screws (not shown) into the mounting holes 530.

The lens holder 600 is connected to the suspension base 500 in a rockable manner by means of the four suspensions 550A to 550D. The lens holder 600 is a generally rectangular member with a hollow structure which has been molded with a synthetic resin. The lens holder 600 is formed simultaneously with the suspension base 500 through insert molding, namely, by installing the flat plate portions 560 of the suspensions 550A to 550D in the mold and injecting a synthetic resin. A pair of support arms 630 are respectively provided at opposite ends of the lens holder 600 in the tracking direction T. The suspensions 550A to 550D are fixed at ends thereof to the corresponding support arms 630.

In the pickup device 1, the other portions are identical to those of Embodiment 1 of the present invention.

[Mounting Structure of Suspensions]

Figure 11:
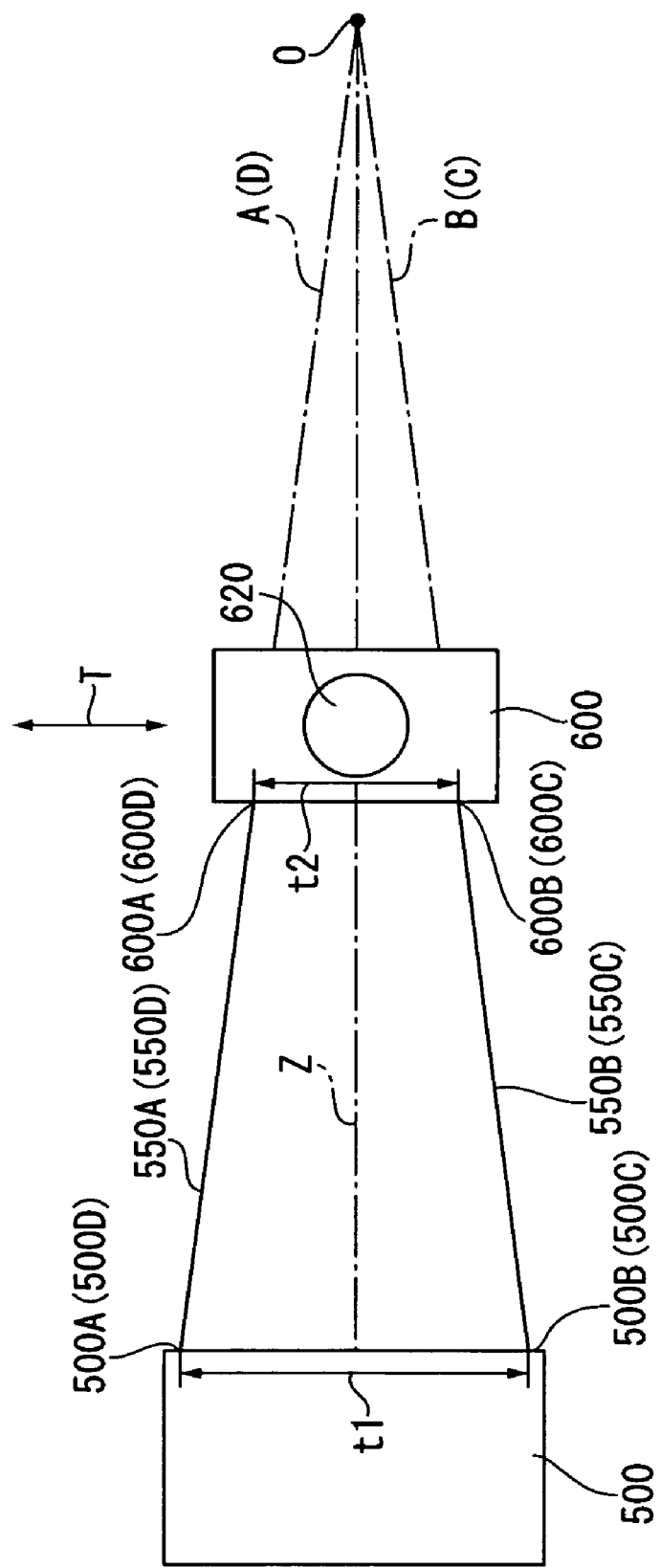
[FIG. 11] A schematic diagram showing a mounting structure of suspensions as viewed from a focusing direction.
Figure 12:
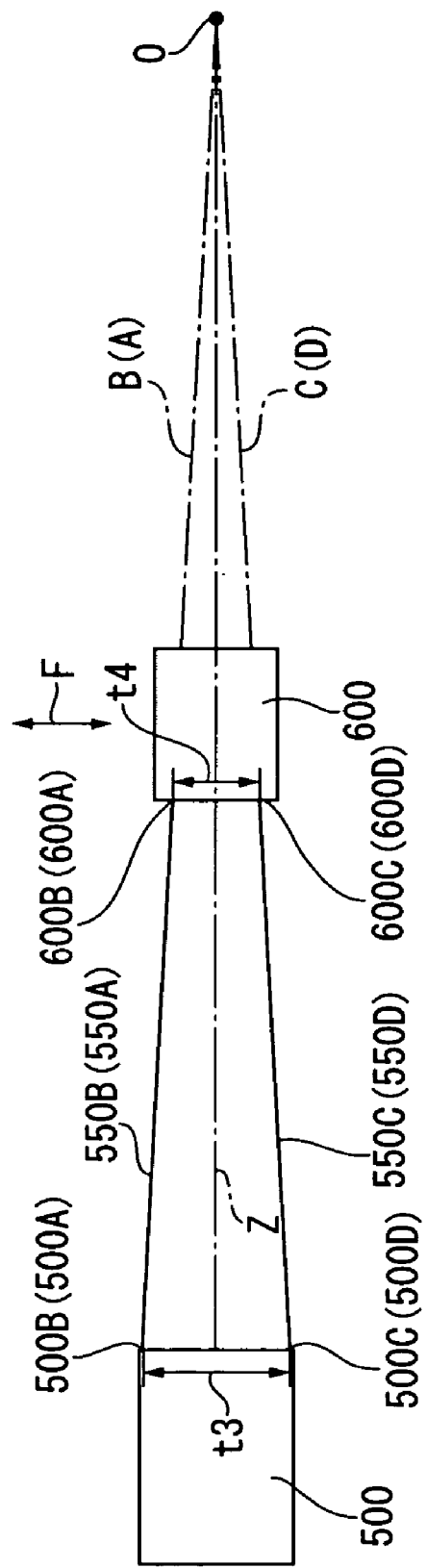
[FIG. 12] A schematic diagram showing the mounting structure of the suspensions as viewed from a tracking direction.
Figure 13:
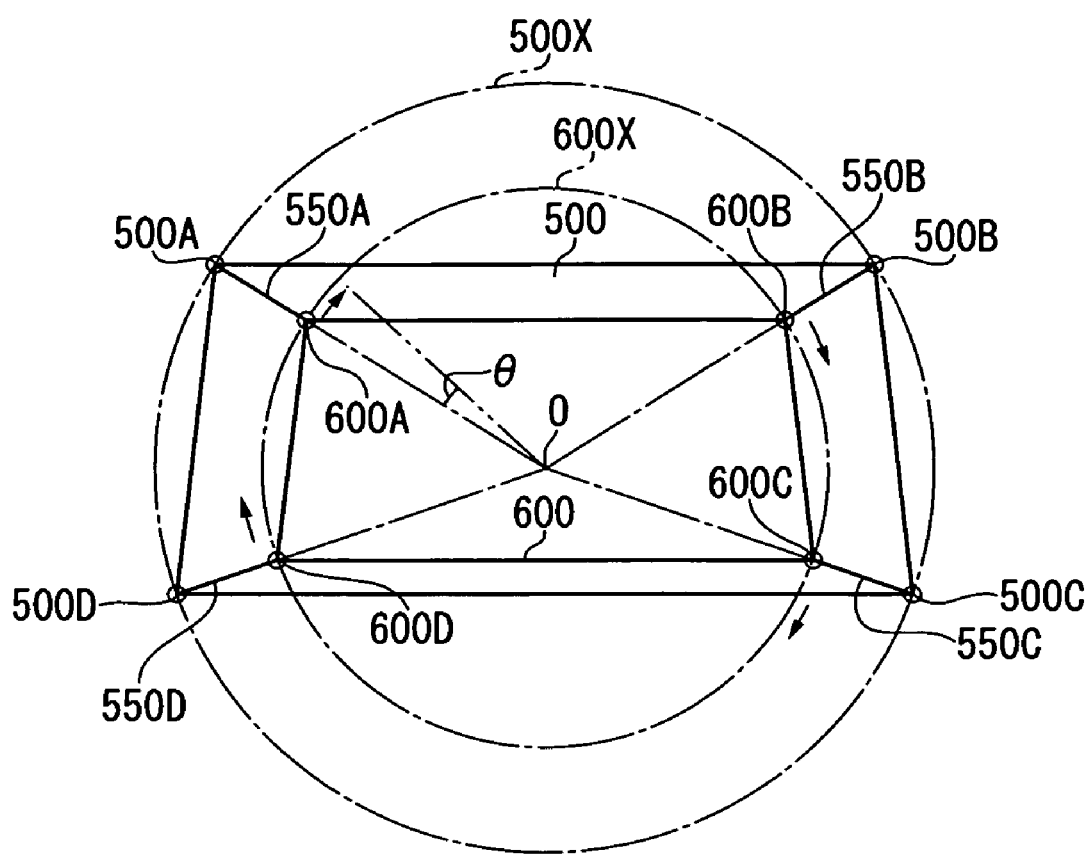
[FIG. 13] A schematic diagram showing the mounting structure of the suspensions as viewed in a direction from a suspension base to a lens holder.
Figure 14:
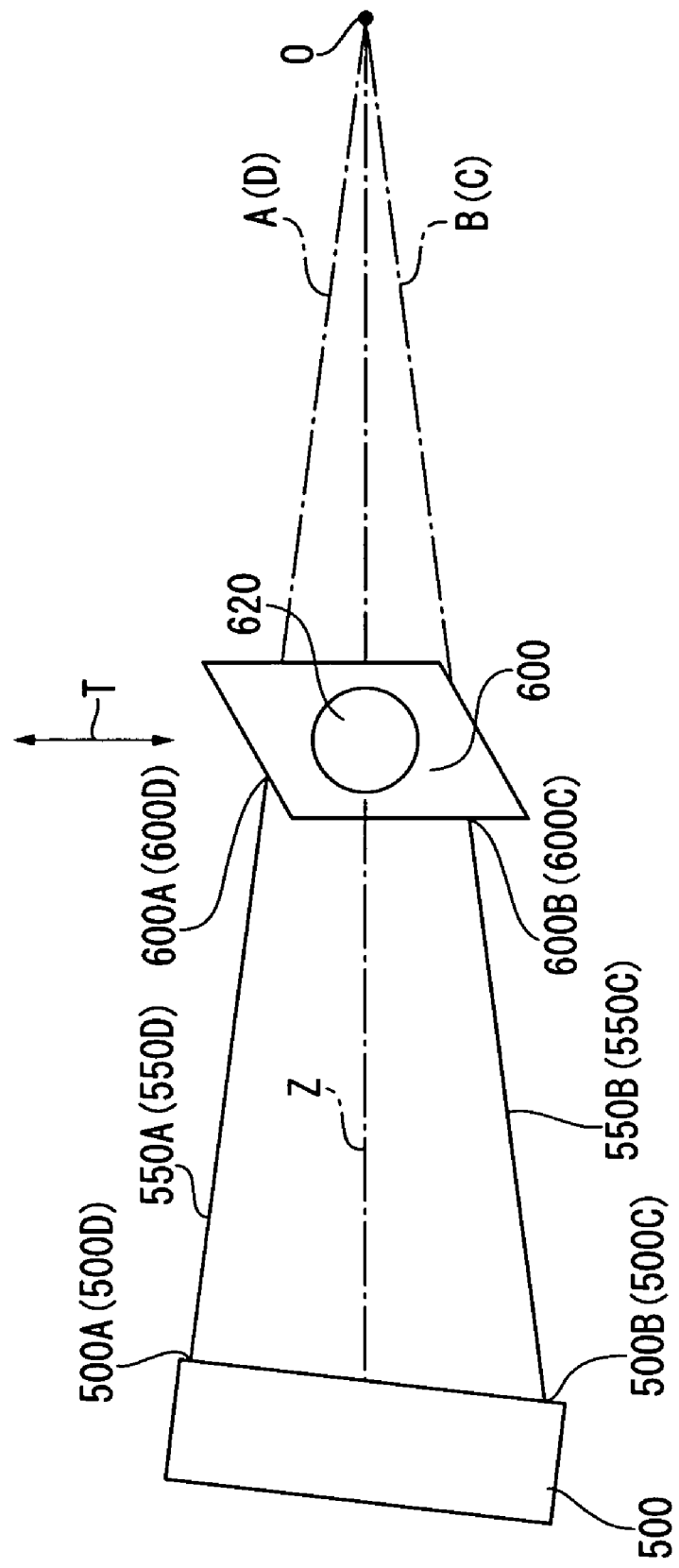
[FIG. 14] A schematic diagram showing a modified example of Embodiment 3 of the present invention, which corresponds to FIG. 11.

FIGS. 11, 12, and 13 each schematically show a mounting structure of the suspensions 550A to 550D.

In FIG. 11, the suspensions 550A and 550B, which are adjacent to each other when viewed from the focusing direction, are designed such that the dimension t1 between the connection portions 500A and 500B of the suspensions connected to the suspension base 500 is larger than the dimension t2 between the connection portions 600A and 600B of the suspensions connected to the lens holder 600, and virtual extended lines A and B extending in longitudinal directions of the suspensions 550A and 550B, respectively, intersect with each other at the single point O. That is, the suspensions 550A and 550B are disposed substantially in a slanting manner.

Similarly, the suspensions 550C and 550D, which are adjacent to each other when viewed from the focusing direction, are designed such that the dimension t1 between the connection portions 500C and 500D of the suspensions connected to the suspension base 500 is larger than the dimension t2 between the connection portions 600C and 600D of the suspensions connected to the lens holder 600, and virtual extended lines C and D extending in the longitudinal directions of the suspensions 550C and 550D, respectively, intersect with each other at the single point O.

In FIG. 12, the suspensions 550B and 550C, which are adjacent to each other when viewed from the tracking direction, are designed such that the dimension t3 between the connection portions 500B and 500C of the suspensions connected to the suspension base 500 is larger than the dimension t4 between the connection portions 600B and 600C of the suspensions connected to the lens holder 600. The virtual extended lines B and C extending in the longitudinal directions of the suspensions 550B and 550C, respectively, intersect with each other at the single point O. That is, the suspensions 550B and 550C are disposed substantially in a slanting manner.

Similarly, the suspensions 550A and 550D, which are adjacent to each other when viewed from the tracking direction, are designed such that the dimension t3 between the connection portions 500A and 500D of the suspensions connected to the suspension base 500 is larger than the dimension t4 between the connection portions 600A and 600D of the suspensions connected to the lens holder 600. The virtual extended lines A and D extending in the longitudinal directions of the suspensions 550A and 550D, respectively, intersect with each other at the single point O.

In FIG. 13, the connection portions 500A, 500B, 500C, and 500D of the suspensions 550A to 550D, respectively, on the suspension base 500 side are located on the first virtual circle 500X, and the connection portions 600A, 600B, 600C, and 600D of the suspensions 550A to 550D, respectively, on the lens holder 600 side are located on the second virtual circle 600X, which is different from the first virtual circle 500X.

A virtual center line Z connecting centers of the two virtual circles 500X and 600X to each other and the virtual extended lines A to D extending in the longitudinal directions of the four suspensions 550A to 550D, respectively, intersect with one another at the single point O.

In the actuator 400 for the pickup constructed as described above, when the lens holder 600 turns with respect to the suspension base 500 by the angle θ, tensile forces are generated in all the suspensions 550A to 550D. Therefore, no relative displacement occurs in the axial direction.

In this embodiment, the line segments each connecting the connection portions 500A to 500D to each other and the line segments each connecting the connection portions 600A to 600D to each other respectively constitute an oblong. In FIG. 13, however, a trapezoid is illustrated as a figure formed by the line segments connecting the connection portions to each other for the sake of comprehensibility. In this embodiment, a shape formed by the line segments connecting the connection portions to each other is not limited as long as the foregoing construction is established. For example, the line segments may constitute a square as well as an oblong or a trapezoid.

The suspensions 550A to 550D are formed rectilinearly in the drawings. In this embodiment, however, the suspensions 550A to 550D may be bent. In this case, it is appropriate that the virtual lines connecting the connection portions of the suspensions 550A to 550D to one another satisfy the aforementioned relationship.

[Method of Producing Actuator for Pickup]

To produce the actuator 400 for the pickup according to this embodiment, the four suspensions 550A to 550D are first disposed at predetermined positions of a mold (not shown) having a cavity for molding the suspension base 500 and the lens holder 600.

Then, the two suspensions 550A and 550B, which are adjacent to each other when viewed from the focusing direction, are disposed such that a dimension between the connection portions 500A and 500B of the suspensions connected to the suspension base 500 becomes larger than a dimension between the connection portions 600A and 600B of the suspensions connected to the lens holder 600. The suspensions 550B and 550C, which are adjacent to each other when viewed from the tracking direction, are disposed such that a dimension between the connection portions 500B and 500C of the suspensions connected to the suspension base 500 becomes larger than a dimension between the connection portions 600B and 600C of the suspensions connected to the lens holder 600.

After that, a synthetic resin in a fluid state is injected into the mold. Then, the actuator 400 for the pickup is insert-molded with the suspensions 550A to 550D being connected between the suspension base 500 and the lens holder 600.

[Operational Effect of Actuator for Pickup]

The actuator 400 for the pickup according to this embodiment is equipped with the suspension base 500, the lens holder 6Q0 designed to be movable in each of the tracking direction and the focusing direction extending along the optical axis of the objective lens 620, for holding the objective lens 620, and the four suspensions 550A to 550D each having ends connected to the suspension base 500 and the lens holder 600, respectively. The two suspensions 550A and 550B, which are adjacent to each other when viewed from the focusing direction, are designed such that the dimension t1 between the connection portions 500A and 500B of the suspensions connected to the suspension base 500 is larger than the dimension t2 between the connection portions 600A and 600B of the suspensions connected to the lens holder 600. The suspensions 550B and 550C, which are adjacent to each other when viewed from the tracking direction, are designed such that the dimension t3 between the connection portions 500B and 500C of the suspensions connected to the suspension base 500 is larger than the dimension t4 between the connection portions 600B and 600C of the suspensions connected to the lens holder 600. The connection portions 500A to 500D of the four suspensions 550A to 550D, respectively, on the actuator base side are located on the first virtual circle 500X. The connection portions 600A to 600D of the four suspensions 550A to 550D, respectively, on the lens holder side are located on the second virtual circle 600X, which is different from the first virtual circle 500X. The virtual center line Z connecting the centers of the two virtual circles 500X and 600X to each other and the virtual extended lines A to D extending in the longitudinal directions of the four suspensions 550A to 550D, respectively, intersect with one another at the single point O. Therefore, even when the lens holder 600 turns with respect to the suspension base 500, tensile forces are generated in all of the four suspensions 550A to 550D, so no relative displacement occurs in the axial direction. Thus, a rise in rolling frequency can be suppressed to prevent deterioration in damping characteristics.

The pickup device 1 according to this embodiment is equipped with the actuator 400 for the pickup constructed as described above, and the coil substrates 610A and 610B and the magnets 340A and 340B for driving the actuator 400 for the pickup. Therefore, the pickup device 1 capable of achieving the aforementioned effect can be provided.

The recording medium drive device according to this embodiment is equipped with the pickup device 1 constructed as described above. Therefore, the recording medium drive device capable of achieving the aforementioned effect can be provided.

In this embodiment, in producing the actuator 400 for the pickup, the four suspensions 550A to 550D are installed at the predetermined positions in the mold, and a molten resin is injected from the injection port of the mold to perform insert molding. Thus, simultaneously with the molding of the suspension base 500 and the lens holder 600, these members can be connected by the suspensions 550A to 550D. Therefore, the actuator 400 for the pickup can be produced in a short period of time.

MODIFIED EXAMPLE OF EMBODIMENT 3

It should be noted that the recording medium drive device according to the present invention is not limited to Embodiment 3 of the present invention, and can be modified in various manners without departing from the gist of the present invention.

For example, the four suspensions 550A to 550D are used in the Embodiment 3 of the present invention. In the present invention, however, the number of the suspensions 550A to 550D is not specifically limited as long as it is four or more. For example, the number of the suspensions may be five, six, or more.

Further, an insert molding method is adopted for producing the actuator 400 for the pickup in the Embodiment 3 of the present invention. In the present invention, however, the suspension base 500 and the lens holder 600 may be molded separately or simultaneously by and injection molding method, and the suspensions 550A to 550D may then be glued, soldered, or screwed to the suspension base 500 and the lens holder 600.

In the Embodiment 3 of the present invention, the two suspensions 550A and 550B, which are adjacent to each other when viewed from the focusing direction, are designed such that the dimension t1 between the connection portions 500A and 500B of the suspensions connected to the suspension base 500 is larger than the dimension t2 between the connection portions 600A and 600B of the suspensions connected to the lens holder 600. The suspensions 550B and 550C, which are adjacent to each other when viewed from the tracking direction, are designed such that the dimension t3 between the connection portions 500B and 500C of the suspensions connected to the suspension base 500 is larger than the dimension t4 between the connection portions 600B and 600C of the suspensions connected to the lens holder 600. In the present invention, however, the opposite construction is also acceptable. In other words, the clearance between the connection portions on the lens holder side may be made larger than the clearance between the connection portions on the suspension base side.

Further, in the Embodiment 3 of the present invention, the connection portions of the suspensions 550A to 550D are located on the plane including the focusing direction and the tracking direction. In the present invention, however, it is also appropriate that the connection portions of the suspensions 550A to 550D are offset from one another and not located on the aforementioned plane.

For example, as shown in FIG. 13, the line segments linking the connection portions 600A to 600D of the respective suspensions 550A to 550D, which are connected to the lens holder 600, with one another are not parallel to the plane of the coil substrate (not shown) mounted to the lens holder 600. Similarly, the line segments linking the connection portions 500A to 500D of the respective suspensions 550A to 550D, which are connected to the suspension base 500, with each other are not in parallel to the plane of the coil substrate.

INDUSTRIAL APPLICABILITY

The present invention is applicable to an actuator for a pickup, a pickup device, a recording medium drive device, and a method of producing an actuator for a pickup. The present invention is also applicable to a component or the like for recording data onto an optical recording medium and playing back contents thereof.

The invention claimed is:

1. An actuator for a pickup, comprising:
a fixed portion;
a movable portion movable in each of a focusing direction extending along an optical axis of an objective lens and in a tracking direction substantially perpendicular to the focusing direction, for holding the objective lens; and
a plurality of linear elastic members of five or more each having ends connected to the movable portion and the fixed portion, respectively, wherein
the linear elastic members that are adjacent to each other when viewed from the focusing direction are designed such that a distance between connection portions of the linear elastic members connected to the fixed portion is larger than a distance between connection portions of the linear elastic members connected to the movable portion, and
the plurality of linear elastic members have connection portions on a side of the fixed portion which are located on a first virtual circle, and connection portions on a side of the movable portion which are located on a second virtual circle.

2. The actuator for the pickup according to claim 1, wherein the linear elastic members that are adjacent to each other when viewed from the tracking direction are designed such that a distance between the connection portions connected to the fixed portion is larger than a distance between the connection portions connected to the movable portion.

3. The actuator for the pickup according to claim 1, further comprising six of the linear elastic members.

4. A pickup device comprising:
an actuator for a pickup; and
an actuator drive portion for driving the actuator for the pickup, wherein
the actuator for the pickup includes: a fixed portion; a movable portion movable in each of a focusing direction extending along an optical axis of an objective lens and in a tracking direction substantially perpendicular to the focusing direction, for holding the objective lens; and a plurality of linear elastic members of five or more each having ends connected to the movable portion and the fixed portion, respectively, wherein
the linear elastic members that are adjacent to each other when viewed from the focusing direction are designed such that a distance between connection portions of the linear elastic members connected to the fixed portion is larger than a distance between connection portions of the linear elastic members connected to the movable portion, and
the plurality of linear elastic members have connection portions on a side of the fixed portion which are located on a first virtual circle, and connection portions on a side of the movable portion which are located on a second virtual circle.

5. A recording medium drive device, comprising a pickup device including: an actuator for a pickup; and an actuator drive portion for driving the actuator for the pickup, wherein
the actuator for the pickup includes: a fixed portion; a movable portion movable in each of a focusing direction extending along an optical axis of an objective lens and in a tracking direction substantially perpendicular to the focusing direction, for holding the objective lens; and a plurality of linear elastic members of five or more each having ends connected to the movable portion and the fixed portion, respectively, wherein the linear elastic members that are adjacent to each other when viewed from the focusing direction are designed such that a distance between connection portions of the linear elastic members connected to the fixed portion is larger than a distance between connection portions of the linear elastic members connected to the movable portion, and
the plurality of linear elastic members have connection portions on a side of the fixed portion which are located on a first virtual circle, and connection portions on a side of the movable portion which are located on a second virtual circle.

6. A method of producing an actuator for a pickup comprising a fixed portion, a movable portion movable in each of a focusing direction extending along an optical axis of an objective lens and in a tracking direction substantially perpendicular to the focusing direction, for holding the objective lens, and a plurality of linear elastic members of five or more each having ends connected to the movable portion and the fixed portion, respectively,
the method comprising the steps of:
disposing the linear elastic members that are adjacent to each other when viewed from the focusing direction such that a distance between connection portions of the linear elastic members connected to the fixed portion is larger than a distance between connection portions of the linear elastic members connected to the movable portion, in connecting the plurality of linear elastic members to the fixed portion and the movable portion;
locating connection portions of the plurality of linear elastic members on a side of the fixed portion on a first virtual circle; and
locating connection portions of the plurality of linear elastic members on a side of the movable portion on a second virtual circle.

7. The method of producing the actuator for the pickup according to claim 6, further comprising the steps of:
disposing the linear elastic members that are adjacent to each other when viewed from the tracking direction are disposed such that a distance between connection portions of the linear elastic members connected to the fixed portion is larger than a distance between connection portions of the linear elastic members connected to the movable portion, in connecting the plurality of linear elastic members to the fixed portion and the movable portion.

8. The method of producing the actuator for the pickup according to claim 6, further comprising the steps of:
installing the linear elastic members in a mold for molding the fixed portion and the movable portion; and
injecting a molten resin from an injection port of the mold to insert-mold the actuator for a pickup.

9. An actuator for a pickup, comprising:
a fixed portion;
a movable portion movable in each of a focusing direction extending along an optical axis of an objective lens and in a tracking direction substantially perpendicular to the focusing direction, for holding the objective lens; and
six linear elastic members each having ends connected to the movable portion and the fixed portion, respectively, wherein
the linear elastic members that are adjacent to each other when viewed from the focusing direction are designed such that a distance between connection portions of the linear elastic members connected to the fixed portion is larger than a distance between connection portions of the linear elastic members connected to the movable portion, and the six linear elastic members have connection portions on a side of the fixed portion which are located on a first virtual circle, and connection portions on a side of the movable portion which are located on a second virtual circle.

10. The actuator for the pickup according to claim 9, wherein the first virtual circle and the second virtual circle have a common center, and the center of the virtual circles serves as a rotating center of the movable portion.

* * * * *